(12) United States Patent
Chen et al.

(10) Patent No.: US 12,594,839 B2
(45) Date of Patent: Apr. 7, 2026

(54) ELECTRIFIED VEHICLE LOW-VOLTAGE (LV) BUS VOLTAGE CONTROL

(71) Applicant: Ford Global Technologies, LLC, Dearborn, MI (US)

(72) Inventors: Hanyang Chen, Canton, MI (US); Michael J Irby, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 17/969,858

(22) Filed: Oct. 20, 2022

(65) Prior Publication Data

US 2024/0131935 A1 Apr. 25, 2024
US 2024/0227576 A9 Jul. 11, 2024

(51) Int. Cl.
| | |
|---|---|
| *B60L 15/20* | (2006.01) |
| *B60L 50/60* | (2019.01) |
| *B60L 58/20* | (2019.01) |
| *G07C 5/08* | (2006.01) |

(52) U.S. Cl.
CPC .............. *B60L 15/20* (2013.01); *B60L 50/60* (2019.02); *G07C 5/0808* (2013.01); *G07C 5/0825* (2013.01); *B60L 2210/10* (2013.01); *B60L 2250/26* (2013.01)

(58) Field of Classification Search
CPC ...... B60L 15/20; B60L 50/60; B60L 2210/10; B60L 2250/26; G07C 5/0808

USPC ........................................................ 307/10.1
See application file for complete search history.

(56) References Cited

U.S. PATENT DOCUMENTS

| | | | |
|---|---|---|---|
| 8,988,078 B2 | 3/2015 | Kiuchi | |
| 10,913,443 B2 | 2/2021 | Chen et al. | |
| 2018/0246169 A1 | 8/2018 | Miura et al. | |
| 2023/0311683 A1* | 10/2023 | Lachaize ................. | B60L 53/22 |
| | | | 320/104 |
| 2024/0034188 A1* | 2/2024 | Lee .......................... | B60L 58/13 |

* cited by examiner

*Primary Examiner* — Rexford N Barnie
*Assistant Examiner* — Swarna N Chowdhuri
(74) *Attorney, Agent, or Firm* — David B. Kelley; Brooks Kushman P.C.

(57) ABSTRACT

An electrified vehicle includes a traction battery coupled to an electric machine that provides propulsive force, an auxiliary battery, a voltage converter coupled to the traction battery and configured to convert traction battery voltage to auxiliary battery voltage, and a controller programmed to control the voltage converter to provide either a non-oscillating voltage above a first voltage threshold, or an oscillating voltage having a peak below the first voltage threshold based on a vehicle start signal and a vehicle brake pedal position signal. The controller may control the voltage converter to provide the non-oscillating voltage in response to the vehicle start signal being received while the brake pedal position signal indicates a released brake pedal, and to provide the oscillating voltage in response to the vehicle start signal being received while the brake pedal position signal indicates a depressed brake pedal.

15 Claims, 2 Drawing Sheets

ELECTRIFIED VEHICLE LOW-VOLTAGE (LV) BUS VOLTAGE CONTROL

TECHNICAL FIELD

This disclosure generally relates to controlling voltage of a low-voltage (LV) bus powered by a high-voltage (HV) traction battery and a DC/DC voltage converter in an electrified vehicle having an LV auxiliary battery.

BACKGROUND

Electrified vehicles, including plug-in hybrid electric vehicles (PHEVs) and battery electric vehicles (BEVs), have an electric machine powered by an HV traction battery to propel the vehicle. The HV traction battery may also power various vehicle systems and components including both HV and LV systems and components connected via an HV bus and LV bus, respectively. A DC/DC voltage converter is controlled to deliver power from the HV traction battery to the LV bus at a desired voltage for the LV system, which includes an LV auxiliary battery that may also power various LV components and systems when the HV traction battery is disconnected from the HV bus.

SUMMARY

According to one or more aspects of the present disclosure, an electrified vehicle includes an electric machine powered by a high-voltage battery, a voltage converter coupled to the high-voltage battery and a low-voltage auxiliary battery, and a controller programmed to control the voltage converter to provide an output voltage greater than a first voltage threshold to the low-voltage auxiliary battery in response to a vehicle start signal received while a brake pedal is depressed, and to provide an oscillating output voltage with a peak amplitude less than the first voltage threshold to the low-voltage auxiliary battery in response to the vehicle start signal being received while the brake pedal is released. The controller may be further programmed to generate a diagnostic signal in response to current of the low-voltage auxiliary battery being less than a first current threshold when the output voltage is above the first voltage threshold. The electrified vehicle may include a human-machine interface (HMI), wherein the HMI generates an alert in response to the diagnostic signal. The controller may be further programmed to generate a diagnostic signal in response to current variation of the low-voltage auxiliary battery being less than a second current threshold when the voltage converter is providing the oscillating output voltage.

In various embodiments, an electrified vehicle includes a controller that controls the voltage converter to provide an oscillating voltage with an oscillation frequency of 1 Hz. The controller may control the voltage converter to provide the oscillating voltage with a peak-to-peak amplitude of less than 2% of a predetermined target voltage associated with the low-voltage auxiliary battery, such as a peak-to-peak voltage of 0.2V for a lead-acid auxiliary battery having a nominal voltage of 13V.

In one or more embodiments, the voltage converter comprises a DC/DC converter. The controller may communicate an oscillating target voltage command to the DC/DC converter to provide the oscillating output voltage.

Embodiments also include a method for controlling an electrified vehicle having a high-voltage traction battery coupled by a voltage converter to a low-voltage auxiliary battery, comprising, by a vehicle controller: controlling the voltage converter to provide an oscillating output voltage to the low-voltage auxiliary battery in response to receiving a start signal while a vehicle brake pedal is released; and generating a diagnostic signal in response to variation of current supplied to the low-voltage auxiliary battery being less than a first current variation threshold. The method may also include controlling the voltage converter to provide an output voltage greater than a first voltage threshold in response to receiving the start signal while the vehicle brake pedal is depressed, and generating the diagnostic signal in response to the current supplied to the low-voltage auxiliary battery being less than a first current threshold. In one or more embodiments, the oscillating output voltage has a maximum voltage less than the first voltage threshold. Generating the diagnostic signal may be performed after the current supplied to the low-voltage auxiliary battery is less than the first current threshold for a predetermined period of time. The voltage converter may be a DC/DC converter with the method controlling the voltage converter to provide an oscillating output voltage by generating an oscillating target command voltage communicated to the DC/DC converter. In one or more embodiments, the oscillating output voltage has a frequency of 1 Hz and a peak-to-peak amplitude of less than 5% of a predetermined target voltage associated with the low-voltage auxiliary battery. The method include communicating an alert to a vehicle human-machine interface (HMI) in response to the diagnostic signal. The diagnostic signal may be generated after the current supplied to the low-voltage auxiliary battery is less than the first current variation threshold for a predetermined period of time.

Embodiments also include a system including a traction battery coupled to an electric machine that provides propulsive force to an electrified vehicle, an auxiliary battery, a voltage converter coupled to the traction battery and configured to convert traction battery voltage to auxiliary battery voltage, and a controller programmed to control the voltage converter to provide either a non-oscillating voltage above a first voltage threshold, or an oscillating voltage having a peak below the first voltage threshold based on a vehicle start signal and vehicle brake pedal position signal. The controller may be further programmed to control the voltage converter to provide the non-oscillating voltage in response to the vehicle start signal being received while the brake pedal position signal indicates a released brake pedal. The controller may be further programmed to control the voltage converter to provide the oscillating voltage in response to the vehicle start signal being received while the brake pedal position signal indicates a depressed brake pedal. The controller may be further programmed to generate a diagnostic signal in response to current to the auxiliary battery being below a corresponding current threshold while the voltage converter provides the non-oscillating voltage. The controller may be further programmed to generate a diagnostic signal in response to variation of current to the auxiliary battery being below a corresponding current variation threshold while the voltage converter provides the oscillating voltage.

DETAILED DESCRIPTION

Figure 1:
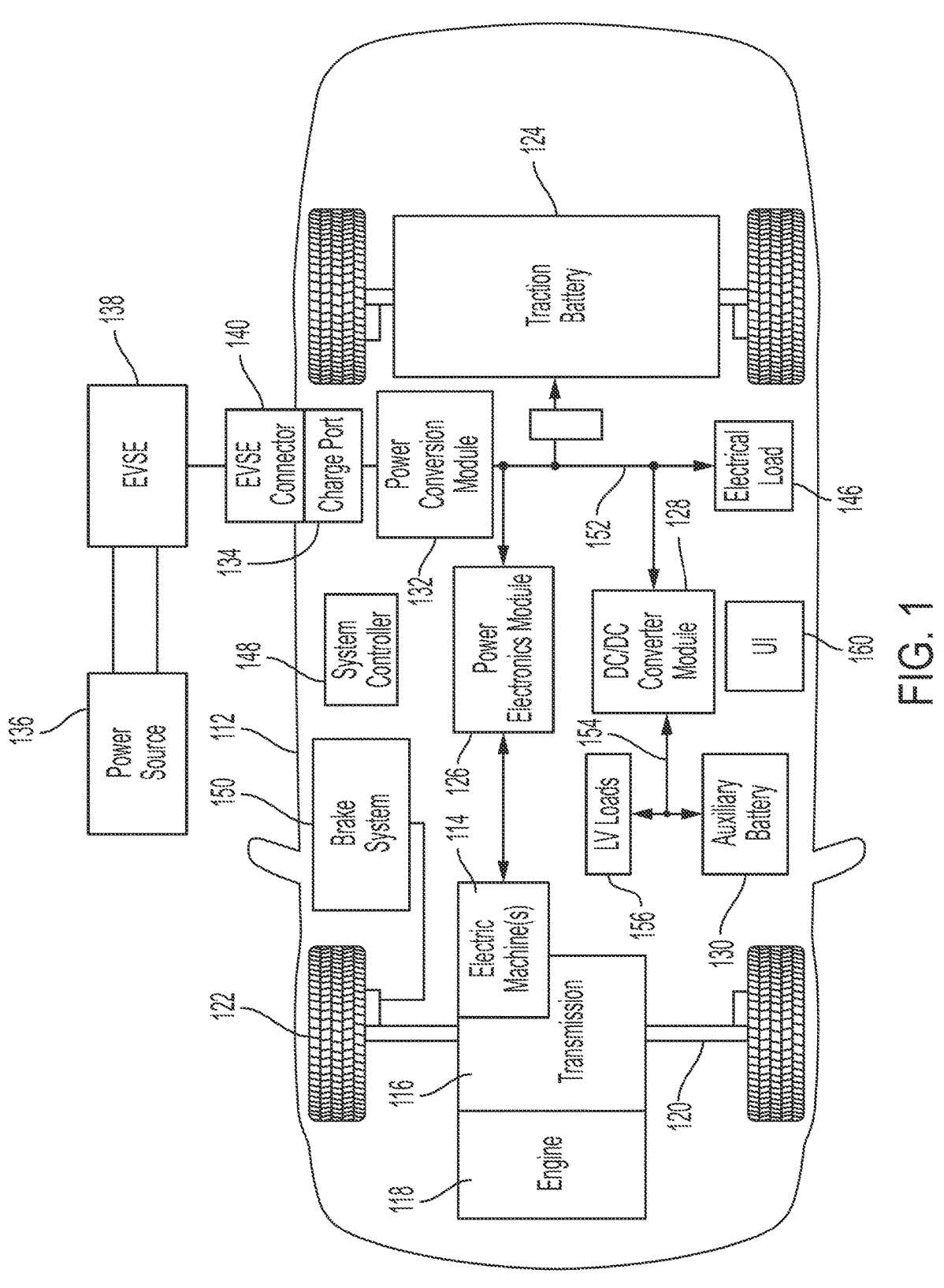
FIG. 1 is a diagram illustrating an electrified vehicle having a voltage converter controlled according to one or more embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present inventors have recognized that a properly connected and operating auxiliary battery of an electrified vehicle should exhibit a current change in response to an applied voltage change. If the current and voltage do not correlate sufficiently, this may indicate that the battery has become disconnected or unreliably connected, which may result from loose connections, corrosion, or various other situations. One strategy for detecting this condition is described in commonly owned U.S. Ser. No. 10/913,443B2.

Electrified vehicles, including but not limited to PHEVs and BEVs, typically include a powerful DC/DC converter (3 kW, for example) that converts electric energy from the high-voltage traction battery to supply a low-voltage bus connected to the auxiliary battery, which is typically 12V in passenger vehicles, but may be 24V or 48V in some commercial and industrial vehicles, for example. The DC/DC converter is designed to provide a stable output voltage that exhibits only minor fluctuations with connection or disconnection of LV loads (on the order of tens of watts). Therefore, prior strategies for monitoring the auxiliary battery connection and operation may only be triggered when a large load (such as a climate control fan on high, electric power assisted steering (EPAS) activation, high beam activation, etc.) is turned on or turned off. Vehicle testing has indicated that one or more previous strategies may require tens of seconds or longer for successful and reliable detection of this condition, which may be suitable for some applications, but may not meet minimum requirements for other applications, such as autonomous vehicles (AVs). Many electric features or systems in AVs require features that satisfy ASIL C or ASIL D level requirements. Some vehicle features such as RePA (Remote Parking Assistance) are in ASIL B level requirements even for non-AV vehicles.

As such, one or more embodiments according to the present disclosure control a voltage converter of an electrified vehicle to facilitate robust and fast detection of a disconnected or intermittent connection of an auxiliary battery that may be caused by loose connections, corrosion, degraded battery, or similar issues.

FIG. 1 is a diagram illustrating an electrified vehicle having a controller programmed to control a voltage converter according to one or more embodiments of the disclosure. Electrified vehicle 112 in this example is a plug-in hybrid-electric vehicle (PHEV) for purposes of illustration and description. As previously described, those of ordinary skill in the art will recognize a wide variety of electrified vehicle and non-vehicle applications that may benefit from voltage converter control according to the present disclosure.

A plug-in hybrid-electric vehicle 112 may include one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to one or more of the wheels 122. An electrified vehicle 112 may also be a battery electric vehicle (BEV) without an engine 118.

A high-voltage (HV) battery pack or traction battery 124 stores energy that can be used by the electric machines 114. The traction battery 124 may provide a high voltage (HV) direct current (DC) output. As generally understood by those of ordinary skill in the art, high voltage generally refers to voltages above 60 VDC and representative traction battery packs may connect multiple low-voltage cells to operate at a pack voltage in the hundreds of volts, such as 300-800 VDC, for example. Low voltage (LV) systems and components for passenger vehicles may operate at a nominal 12 VDC, while commercial vehicles or transportation vehicles may have LV systems that operate at 24 VDC or 48 VDC, for example.

In addition to providing energy for propulsion, the traction battery 124 may provide energy for other vehicle electrical systems. The electrified vehicle 112 may include a voltage converter, such as a DC/DC converter module 128 that converts the high voltage DC output from the high-voltage bus 152 to a low-voltage DC level of a low-voltage bus 154 that is compatible with low-voltage loads 156. Loads may include one or more fluid pumps that pump a lubricating and/or cooling fluid to the vehicle drivetrain or propulsion system, which may include electric machines 114, transmission 116, engine 118, traction battery 124, DC/DC converter module 128, and power conversion module 132, for example. Other LV loads include various system controllers or control modules that power and/or control vehicle accessories, lights, displays, interfaces, driver inputs, etc.

An output of the DC/DC converter module 128 may be electrically coupled to a low-voltage auxiliary battery 130 (i.e., 12V, 24V, or 48V battery) for charging the auxiliary battery 130. The low-voltage loads 156 may be electrically coupled to the auxiliary battery 130 via the low-voltage bus 154. One or more controllers, such as system controller 148 and/or a battery electronic control module (BECM) may be powered by the low-voltage bus 154 and may be programmed to control the DC/DC converter module 128 according to the present disclosure. In one or more embodiments, one or more controllers are programmed to control the voltage converter module 128 to provide an output voltage greater than a first voltage threshold to the low-voltage auxiliary battery 130 in response to a vehicle start signal received while a brake pedal is depressed, and to provide an oscillating output voltage with a peak amplitude less than the first voltage threshold to the low-voltage auxiliary battery in response to the vehicle start signal being received while the brake pedal is released. The start signal may be received from activation of an ignition key, wireless device (such as a key fob or smart phone), or activation of a pushbutton, for example. Brake pedal position may be provided by an associated sensor that generates a brake pedal position signal and/or a binary signal that indicates whether a vehicle brake pedal is depressed or released. Receiving a start signal with the brake pedal depressed may activate a propulsion or "Run" mode of the vehicle while receiving a start signal with the brake pedal released may activate an "ACC" or "Accessory" mode of the vehicle that does not enable propulsion, but does enable use of various vehicle components and accessories, such as lighting and infotainment, for example.

When operating in a propulsion or run mode, one or more controllers may control the DC/DC converter module 128 to provide a non-oscillating voltage (fixed nominal voltage) to the LV bus. The target voltage may vary based on temperature of the traction battery 124 and on the particular type of auxiliary battery 130. In one embodiment, voltage converter 128 is controlled to provide a non-oscillating (fixed) voltage having a target or nominal value of between 13.3-15.2 VDC depending on the temperature of traction battery 124 with an AGM (absorbent glass mat) lead-acid auxiliary battery 130. In this example, the first voltage threshold corresponds to 13.3 VDC. In this embodiment, when operating in an accessory mode, voltage converter 128 is controlled to provide an oscillating voltage having a maximum value less than the first threshold, e.g. a maximum value of 13.2 VDC in this example. The voltage converter 128 may be controlled by communicating or commanding an oscillating target voltage to generate a corresponding output voltage with a peak-to-peak variation of less than 5%, or about 2% in this particular example, e.g. oscillation between 13-13.2 VDC at a predetermined frequency, such as about 1 Hz in this example.

As illustrated and described in greater detail with reference to FIG. 2, the controller may monitor current provided to auxiliary battery 130 from voltage converter 128 to detect a disconnection or poor quality connection due to loose fittings or corrosion, for example, or other degradation in performance of auxiliary battery 130. The current may be measured by a dedicated current sensor, or may be estimated or otherwise determined from one or more other sensors. When the current to auxiliary battery 130 is below a corresponding current threshold while the voltage converter 128 is providing a non-oscillating voltage above a corresponding voltage threshold, controller 148 may generate a diagnostic signal. The diagnostic signal may store a corresponding diagnostic trouble code (DTC) in a memory or non-transitory computer readable storage medium accessible by controller 148. Alternatively, or in combination, the diagnostic signal may generate an alert on user interface (UI) or human-machine interface (HMI) 160. Similarly, when the variation of current to auxiliary battery 130 is below a corresponding current variation threshold while the voltage converter 128 is providing an oscillating voltage having a peak value less then the corresponding voltage threshold, controller 148 may generating a diagnostic signal that may be used to generate a DTC and/or alert as previously described.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. Alternatively, various components described as being electrically coupled or connected may transfer power using a wireless inductive coupling.

The electrified vehicle 112 may further include a human-machine interface (HMI) or user interface (UI) 160. The user interface 160 may provide a variety of display elements for communicating information to the operator. The user interface 160 may provide a variety of input elements for receiving information from the operator and may be used to initiate a one-time battery preconditioning using a designated service mode or key during vehicle assembly, for example. The user interface 160 may include one or more displays. The displays may be touch-screen displays that both display information and receive input. The user interface 160 may include discrete lamps/lights. For example, the lamps may include light-emitting diodes (LED). The user interface 160 may include switches, rotary knobs, sliders, and buttons for allowing the operator to change various settings. The user interface 160 may include a control module that communicates via the vehicle network.

While illustrated as a single controller, controller 148 generally represents multiple vehicle controllers that receive signals from associated sensors and control corresponding actuators. Controllers or control modules may be dedicated to a particular vehicle system, subsystem, or component and may include programmable microprocessor-based controllers and microcontrollers that perform various functions and algorithms based on stored program instructions. Various controllers may communicate over one or more channels of the vehicle network(s).

Figure 2:
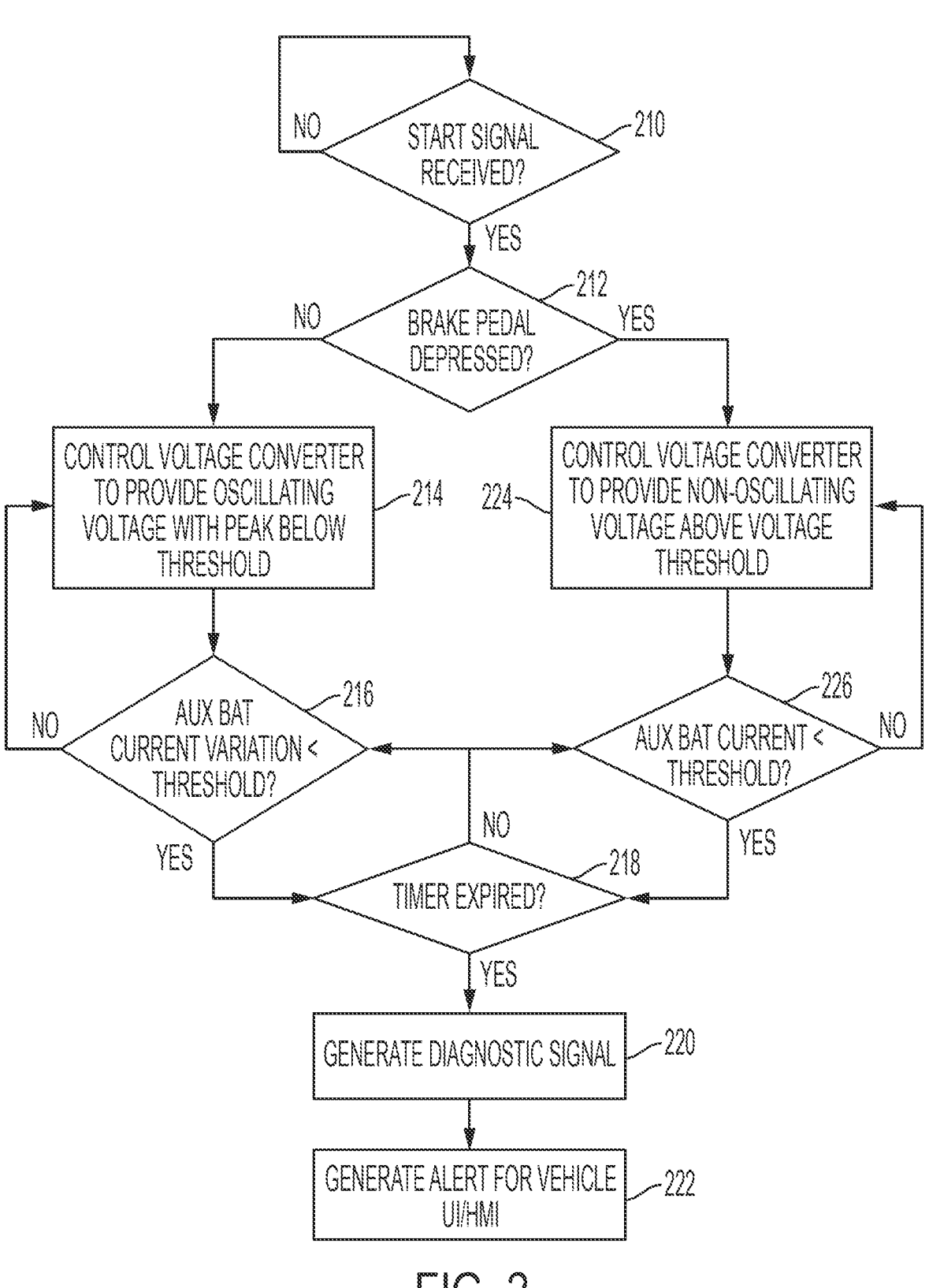
FIG. 2 is a flowchart illustrating operation of a system or method for controlling an electrified vehicle voltage converter according to one or more embodiments of the disclosure.

FIG. 2 is a flowchart illustrating operation of a system or method for controlling an electrified vehicle voltage converter according to one or more embodiments of the disclosure. Control logic or functions represented in FIG. 2 may be performed by one or more controllers individually or in combination/cooperation with other controllers. FIG. 2 provides a representative control strategy and/or logic that may be implemented using one or more processing strategies such as event-driven, interrupt-driven, multi-tasking, multi-threading, and the like. As such, various steps or functions illustrated may be performed in the sequence illustrated, in parallel, in a different sequence, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, battery, and/or powertrain controller, such as controller 148. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Block 210 of FIG. 2 determines whether a vehicle start signal has been received, and if so, block 212 determines whether the brake pedal is depressed. A vehicle start signal may be received from a push button, ignition key, wireless key fob or smart phone, etc. The brake pedal signal may be based on a brake pedal position sensor signal and/or a binary signal that is generated when the brake pedal is depressed. If the brake pedal is depressed as indicated at 212 when the start signal is received as indicated at 210, then the vehicle may enter a "RUN" mode that allows shifting of the transmission into a propulsion mode with control proceeding to block 224. Otherwise, the vehicle may enter an "ACC" or accessory mode that does not allow vehicle propulsion with control proceeding to block 214.

Block 214 represents controlling the voltage converter to provide an oscillating voltage output having a peak value below an associated voltage threshold. For a DC/DC voltage converter, the voltage converter may be controlled by providing an oscillating command signal to provide a varying or oscillating nominal target voltage. In one embodiment, the voltage threshold corresponds to 13.2 V and the oscillating command varies the target voltage in an oscillating manner between 13.0 V and 13.2V at a frequency of 1 Hz. The current to the auxiliary battery is monitored to determine if the current variation or delta current is less than a corresponding current variation threshold as indicated at 216. If the current variation remains below the corresponding current variation threshold for a predetermined time as indicated at 218, then a diagnostic signal is generated at 220. The diagnostic signal may be used to generate a corresponding alert for the vehicle UI/HMI as indicated at 222. A corresponding DTC may also be stored for subsequent maintenance diagnostics.

Block 224 represents controlling the voltage converter to provide a steady or non-oscillating voltage above the voltage threshold (13.2 V in one embodiment). The non-oscillating or steady voltage may be determined based on temperature of the traction battery. In one embodiment, the non-oscillating voltage is controlled to a set value that may range between 13.3-15.2 V. If the auxiliary batter current is less than a current threshold for a predetermined time as indicated by blocks 226 and 228, respectively, then a corresponding diagnostic signal and UI/HMI alert may be generated as indicated at blocks 220 and 222, respectively.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. An electrified vehicle comprising:
an electric machine powered by a high-voltage battery;
a voltage converter coupled to the high-voltage battery and a low-voltage auxiliary battery; and
a controller programmed to control the voltage converter to provide an output voltage greater than a first voltage threshold to the low-voltage auxiliary battery in response to a vehicle start signal received while a brake pedal is depressed, and to provide an oscillating output voltage with a peak amplitude less than the first voltage threshold to the low-voltage auxiliary battery in response to the vehicle start signal being received while the brake pedal is released;
wherein the controller is further programmed to generate a diagnostic signal in response to current of the low-voltage auxiliary battery being less than a first current threshold when the output voltage is above the first voltage threshold.

2. The electrified vehicle of claim 1 further comprising a human-machine interface (HMI), wherein the HMI generates an alert in response to the diagnostic signal.

3. The electrified vehicle of claim 1 wherein the controller is further programmed to generate a diagnostic signal in response to current variation of the low voltage auxiliary battery being less than a second current threshold when the voltage converter is providing the oscillating output voltage.

4. The electrified vehicle of claim 1 wherein the controller controls the voltage converter to provide the oscillating voltage with an oscillation frequency of 1 Hz.

5. The electrified vehicle of claim 1 wherein the controller controls the voltage converter to provide the oscillating voltage with a peak-to-peak amplitude of less than 2% of a predetermined target voltage associated with the low-voltage auxiliary battery.

6. The electrified vehicle of claim 1 wherein the voltage converter comprises a DC/DC converter and wherein the controller communicates an oscillating target voltage command to the DC/DC converter to provide the oscillating output voltage.

7. A method for controlling an electrified vehicle having a high-voltage traction battery coupled by a voltage converter to a low-voltage auxiliary battery, comprising, by a vehicle controller: controlling the voltage converter to provide an oscillating output voltage to the low-voltage auxiliary battery in response to receiving a start signal while a vehicle brake pedal is released; and generating a diagnostic signal in response to variation of current supplied to the low-voltage auxiliary battery being less than a first current variation threshold;

controlling the voltage converter to provide an output voltage greater than a first voltage threshold in response to receiving the start signal while the vehicle brake pedal is depressed; and generating the diagnostic signal in response to the current supplied to the low-voltage auxiliary battery being less than a first current threshold when the output voltage is above the first voltage threshold.

8. The method of claim 7 wherein the oscillating output voltage has a maximum voltage less than the first voltage threshold.

9. The method of claim 7 wherein generating the diagnostic signal is performed after the current supplied to the low-voltage auxiliary battery is less than the first current threshold for a predetermined period of time.

10. The method of claim 7 wherein the voltage converter comprises a DC/DC converter and wherein controlling the voltage converter to provide an oscillating output voltage comprises generating an oscillating target command voltage communicated to the DC/DC converter.

11. The method of claim 7 wherein the oscillating output voltage has a frequency of 1 Hz and a peak-to-peak amplitude of less than 5% of a predetermined target voltage associated with the low-voltage auxiliary battery.

12. The method of claim 7 further comprising communicating an alert to a vehicle human-machine interface (HMI) in response to the diagnostic signal.

13. The method of claim 7 wherein generating the diagnostic signal is performed after the current supplied to the low-voltage auxiliary battery is less than the first current variation threshold for a predetermined period of time.

14. A system comprising:

a traction battery coupled to an electric machine that provides propulsive force to an electrified vehicle;

an auxiliary battery;

a voltage converter coupled to the traction battery and configured to convert traction battery voltage to auxiliary battery voltage; and a controller programmed to:

control the voltage converter to provide a non-oscillating voltage above a first voltage threshold to the auxiliary battery in response to the vehicle start signal being received while the brake pedal position signal indicates a released brake pedal, and an oscillating voltage having a peak below the first voltage threshold based on a in response to the vehicle start signal being received while the brake pedal position signal indicates a depressed brake pedal;

wherein the controller is further programmed to generate a diagnostic signal in response to current to the auxiliary battery being below a corresponding current threshold while the voltage converter provides the non-oscillating voltage.

15. The system of claim 14 wherein the controller is further programmed to generate a diagnostic signal in response to variation of current to the auxiliary battery being below a corresponding current variation threshold while the voltage converter provides the oscillating voltage.

\* \* \* \* \*